MICROWAVE MIXER DIODE COMPRISING A SCHOTTKY BARRIER JUNCTION

Original Filed Jan. 6, 1966 3 Sheets-Sheet 1

INVENTORS:
Alfred Ertel
Tom M. Hyltin
BY John D. Graham
ATTORNEY 3,508,125
MICROWAVE MIXER DIODE COMPRISING A SCHOTTKY BARRIER JUNCTION Alfred Ertel and Tom M. Hyltin, Dallas, Tex., assignors to Texas Instruments Incorporated, Dallas, Tex., a corporation of Delaware Continuation of application Ser. No. 519,039, Jan. 6, 1966. This application June 4, 1968, Ser. No. 769,460
Int. Cl. H01l 5/02
U.S. Cl. 317—234 15 Claims

ABSTRACT OF THE DISCLOSURE

This invention relates to semiconductor devices, and more particularly to metal-semiconductor barrier rectifying devices which are especially suited for use in integrated microwave circuits as mixer diodes.

This is a continuation of Ser. No. 519,039, filed Jan. 6, 1966 (now abandoned).

Microwave transmitting and receiving apparatus has traditionally made use of a large number of components which are mechanically and electrically unreliable, use considerable power, and are unduly large in size. For example, magnetrons and klystrons, mechanically rotating antennas, tuned cavities and the like, traveling wave tubes, waveguide, whisker diodes, etc., exhibit one or more of these disadvantages. For these reasons, it is desirable to construct microwave apparatus, such as a radar system, using no moving parts and employing all solid state components. The rotating antenna must be replaced by an electronically scanned arrangement, such as a phased array system, necessitating the provision of a very large number of similar radiating and receiving modules rather than only one, thus requiring small size and simplicity in construction or low cost for the components of these modules. The whisker diodes used in such a system to provide the mixing and detecting function may be replaced by a semiconductor device of similar characteristics but using no mechanically unstable point contact or whisker. Most of the signal transmission within the modules or system can be provided by microstrip transmission lines rather than waveguide or the like. Signal generation may be provided by solid state oscillators such as transistors instead of magnetrons. The components in the solid state system generally operate at lower power levels than their counterparts in conventional systems, requiring paralleling to produce equivalent power, and also the phased array concept requires major duplication of components. Accordingly, miniaturization and simplicity in construction become mandatory, leading to the necessity for integrating many functions into unitary structures. A diode or transistor, for example, may be capable of operating at extremely high frequency, but this will be of no advantage if the electrical leads and packaging introduce unwanted characteristics at the operating frequency, especially when large numbers of the components are needed. Thus, much of the electrical interconnection and many different functions must be combined into unitary structures.

This invention is directed to one of the component parts or functions which is utilized in solid state microwave apparatus such as a radar system, in particular the diode needed for the mixing function. A mixer diode makes use of the nonlinearity of a rectifying element in the forward conduction region, and to operate at the high frequencies involved it must have a very low capacitance in this region to avoid shunting the signal, as well as a very low series resistance. While it is possible to contruct a p-n junction diode of very small dimensions, its apparent capacitance will still be undesirably high due to storage of minority carriers, this being inherent in the operating mechanism of the device. Thus, it is preferable to use a majority carrier diode, such as the familiar point contact diode. The point contact or whisker diode exhibits unwanted inductance due to the relatively long lead wire, and is mechanically unstable. Also, such a device cannot be easily combined with other circuit functions in a truly unitary or integrated arrangement.

According, it is the principal object of this invention to provide a semiconductor diode which is capable of extremely high frequency operation, which is mechanically and electrically stable, and which may be readily combined with other circuit functions such as strip transmission lines made by fabrication techniques compatible with those used for making the diode. A further object is to provide an improved majority carrier or metal-semiconductro diode, referred to as a Schottky barrier diode, which may be combined with and fabricated as part of a strip transmission line.

In accordance with this invention, a Schottky barrier diode is provided on an extrinsic semiconductor region at one face of a substrate which acts as a dielectric. This substrate may be semiconductor material of very high resistance, for example. The bottom face of the substrate is metallized to provide the ground plane for metal strips on the other face resulting in microstrip transmission line operation. The strips terminate in the cathode and anode contacts to the diode, both of which are on the same side of the structure, with one of these contacts being rectifying and other ohmic as will be explained below.

Novel and distinctive features believed characteristic of the invention are set forth in the appended claims. The invention may best be understood by reference to the following detailed description of illustrative embodiments, read in conjunction with the accompanying drawing, wherein:

Figure 1:
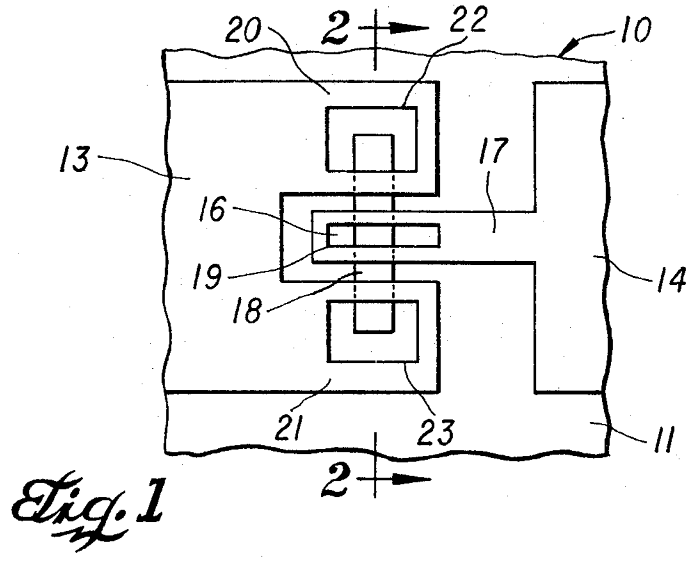
FIGURE 1 is a plan view of a small segment of a miniature semiconductor wafer having therein a diode device according to the invention.

With reference to FIGURE 1, a plan view of a diode according to one embodiment of the invention is illustrated. This diode is formed in one small part of one surface of a slice or bar 10 of silicon. The diode occupies only a small portion, several tenths of a mil square, of a much larger bar which would be perhaps a few tenths of an inch square, and so only the diode is shown in FIGURE 1, greatly enlarged for clarity. Other components would be provided in or on the bar 10 as will be referred to hereinafter. Devices of this type are ordinarily batch fabricated starting with a slice of silicon one or two inches in diameter upon which from a few up to thousands of units are fabricated at the same time, the number depending upon the size of the units. On top of the bar 10, which is high resistivity single crystal silicon, may be provided an insulating coating 11 which is ordinarily silicon dioxide. A pair of metal strips 13 and 14 provide the electrical connections to the cathode and anode respectively of the diode, and it is important to note that these connections function as microstrip transmission lines at the operating frequency of the diode. The back of the bar 10 is provided with a metallized coating 15 which functions as the ground plane for these microstrip transmission lines. The silicon bar 10, being of high resistivity, functions as the dielectric between the strips 13, 14 and the ground plane 15.

The rectifying portion of the diode of FIGURE 1 is of the Schottky barrier or metal-semiconductor barrier type formed by the interface between a portion 16 of a finger-like extension 17 of the strip 14 and an n-type portion 18 of the silicon bar 10. The thin metal strip portion 17 overlies the oxide 11 except where it extends down into a hole 19 to engage the silicon surface at the area 16. It is important to note that the metal of the portion 17 does not alloy with or fuse to the silicon surface but instead makes a metal-semiconductor barrier contact, forming the anode of the diode. The cathode of the diode is provided by the n-type silicon of the region 18, and ohmic, low resistance contact is made to the ends of this region by a pair of finger-like extensions 20 and 21 of the strip 13. These extensions 20 and 21 engage the silicon surface in a pair of holes 22 and 23 etched in the oxide 11 for this purpose. Beneath these points there is provided in the silicon bar a pair of heavily-doped n+ regions 24 and 25 which cause the metal to make non-rectifying rather than rectifying connection to the silicon at the interface.

Figure 2:
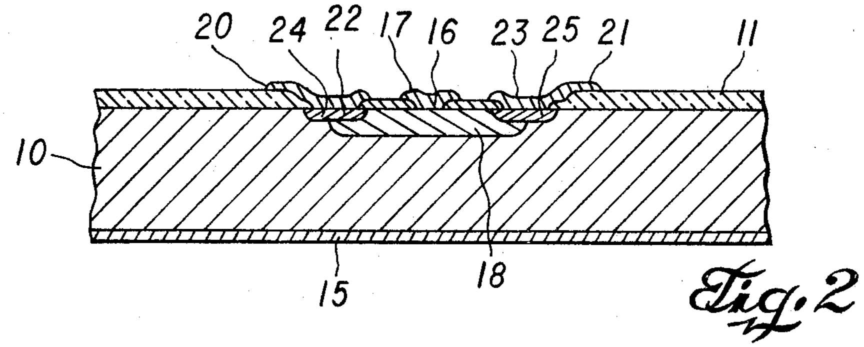
FIGURE 2 is an elevation view in section of the segment of the wafer of FIGURE 1 taken along the line 2—2 in FIGURE 1.

There is thus provided by the structure of FIGURES 1 and 2 a Schottky barrier device formed between abutting ends of strips in a virtually continuous microstrip transmission line, the diode utilizing the silicon substrate which also acts as the dielectric for the transmission line. The capacitance of the diode is very small because of the nature of a Schottky barrier diode as a minority carrier device and also because the anode of the diode does not directly overlie a low resistance cathode portion. The highly conductive portions which in effect form the "plates" of the capacitor are the metal at the area 16 and the n+ regions 24 and 25, these being spaced relatively far apart so that the effective capacitance is low. The region 16 is quite shallow; thus the cross sectional area of the "capacitor" is very small.

Figure 3:
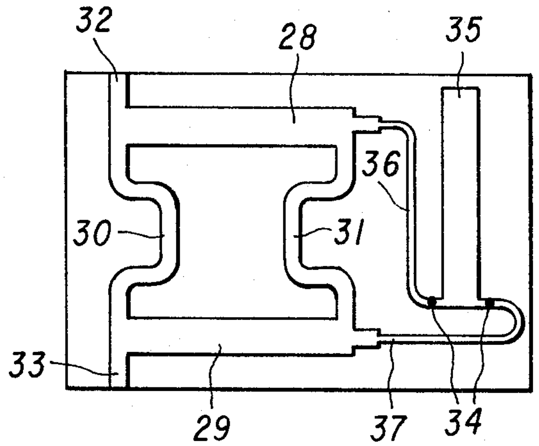
FIGURE 3 is a plan view of a microwave hybrid mixer circuit using the diodes of the invention.

The diode of FIGURES 1 and 2 is utilized in a microwave mixer as is illustrated in FIGURE 3. This is an X-band hybrid mixer circuit suitable for mixing a 9 gHz. incoming signal with an 8.5 gHz. local oscillator signal to produce a 500 mHz. IF frequency. The mixer is formed by metal strip lines deposited on a high resistivity silicon substrate as discussed above, with a metal ground plane formed on the opposite surface. Wide strips 28 and 29 along with narrower strips 30 and 31 form a 3 db hybrid conductor pattern. Input signals at 9 gHz. are applied to a lead 32 and the local oscillator at 8.5 gHz. is applied to a lead 33. Two of the single sided mixer diodes as described above are positioned at points 34 with the anode of one diode and the cathode of the other connected to the output filter 35. This filter is a transmission line section that is one-quarter wavelength long at the mean frequency (8.75 gHz. in the example used). One end of the line is open-circuited, reflecting an extremely low impedance to the end to which diodes 34 are attached. The output is taken from a point between diodes 34 and, as a result of the low impedance reflected to this point by the open circuit transmission line, X-band energy is prevented from reaching the IF amplifier stage. The overall size of the unit of FIGURE 3 is less than a few tenths of an inch on a side, so the extreme small size of the mixer diodes 34 is apparent.

A method for constructing the mixer diode of FIGURES 1–2 will now be described. The starting material in one specific embodiment is a slice of high-resistivity, single crystal silicon for convenience would be perhaps 1¼ inch in diameter and 10 mils thick, the thickness being selected for mechanical rigidity during the various process steps with the requirement that the wafer acts as the dielectric in a transmission line also in mind. The slice may be about 1000 Ω-cm. or more in resistivity, the function of this being to provide the dielectric in the strip transmission lines and also to isolate the diodes and other components from one another in the finished device. One side of the starting slice is suitably etched and cleaned, then the coating of silicon dioxide is applied to this side by thermal oxidation or by low temperature pyrolytic decomposition of a silane. This first oxide layer has a thickness of several thousand A. Next the n-type region 18 is formed in the slice by one of the two methods. One technique is to cut a rectangular hole in the oxide coating by photolithographic masking and etching as is well known in the art, and then diffuse donor impurities into the surface through the hole. The hole would be one or two tenths of a mil in width and almost a mil long. The diffusion may be done by first making a deposition of a phosphorous containing film, as from $POCl_4$, on the surface and then holding at diffusion temperatures, $\approx 1200°$ C., long enough for the phosphorous to diffuse into the silicon to form the n-type region 18, the oxide layer masking the remainder of the surface. It is important that the concentration of phosphorous at the surface be kept low, less than about $10^{16}$ atoms/cm.$^3$ so that the metal contacting the surface at the portion 16 will form a rectifying barrier rather than on ohmic contact. Due to the nature of diffusion, i.e. from a high concentration to a low concentration, the concentration near the surface of the region 18 will be the highest and will decrease with depth. This is opposite to the desired effect since the surface concentration should be low and the concentration higher in the interior to lower the series resistance. Accordingly, a second method may be preferred, although it is somewhat more complex. In this method, a hole is defined as before, but instead of diffusing at this point the slice is placed in an etching environment so that a shallow hole is etched where the silicon is exposed. Here silicon nitride may be used as the coating 11 instead of silicon oxide since it is more etch resistant. Also, it may be noted that for efficient redeposition the mask 11 may merely surround the holes, rather than being continuous, leaving a large area of bare silicon in the intervening spaces. The excess epitaxial material would have to be removed by etching in this case since it would act as a short along the surface. The shape of the etched hole corresponds generally to that of the desired region 18. Now lightly doped n-type silicon, about $10^{15}$, is epitaxially deposited in the etched hole, as by hydrogen reduction of a silicon halide in the presence of a phosphorus-containing volatile compound in accordance with known techniques. The region 18 may thus be formed of n-type silicon uniformly doped from bottom to top so that there need be no compromise between surface concentration and interior concentration. Moreover, the series resistance of the diode may be further reduced by first depositing heavily doped n+ material in the bottom of the etched hole, followed by lightly doped n-type silicon. In this manner, the Schottky barrier diode can be formed on lightly doped material while a low resistance path to the cathode of the diode is provided by heavily doped n+ material. This method results in increased capacitance of the diode, however, and so the compromise here is between series resistance and shunt capacitance. Since the n+ material in the bottom of the hole will extend to the top surface of the bar, the additional diffusion step to form the n+ regions 24 and 25 may not be needed.

After the region 18 is formed by one of the methods discussed above, a thin coating of oxide is applied to the top surface of the slice. If diffusion is used to form the region 18 this oxide will have been the inherent result of the deposition operation, but if the etch and redeposit technique is used, the thin oxide layer is formed by pyrolytic deposition from a silane. In either event, the top face of the slice is masked, using photoresist, and the holes 22 and 23 are etched for the purpose of preparing for the ohmic contacts to the cathode of the diode. The slice is now subjected to another donor diffusion to provide n+ regions 24 and 25. The surface concentration of these regions 24, 25 is perhaps $10^{20}$ or more, much lighter than that of the region 18 under the area 16, so that when metal is deposited on the surface it will form ohmic contact in holes 22 and 23 but rectifying contact to the area 16. The next step after diffusing the regions 24 and 25 is to cover the top surface of the slice with photoresist and expose to light except in the areas above the holes 22 and 23 and above what is to be the hole 19. The unexposed photoresist is then removed by developing, and the underlying oxide is removed by a suitable etchant which does not attack the photoresist or the silicon, after which the photoresist is stripped off. The slice is now ready for metallization. To this end, a thin film of molybdenum is deposited on the entire top surface of the slice by evaporation or sputtering after suitable cleaning, and gold is evaporated on top of the molybdenum. By photoresist masking and etching techniques the unwanted metal is removed leaving the pattern of strips and contacts as illustrated in FIGURES 1–3. The width of the strips 13 and 14 is about 1 mil, which along with the wafer thickness of about 10 mils and the high resistance silicon dielectric provides strip lines having an impedance of about 85Ω. Metal such as gold, aluminum, or molybdenum plus gold is deposited on the back of the bar or slice to provide the ground plane 15. This metal need not alloy with the silicon, but since the substrate material is of very high resistance it is not harmful for it to do so. The large slice can be scribed and broken into individual units as in FIGURE 3.

Figure 4:
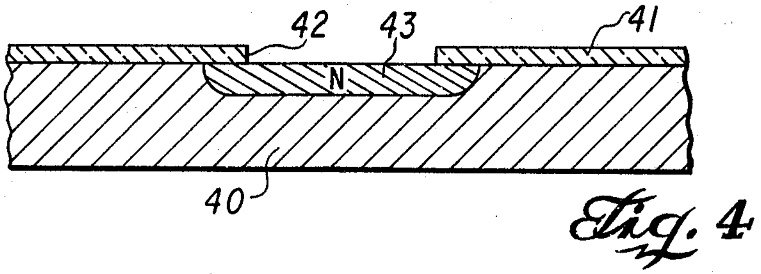
FIGURE 4 is an elevation view in section of a diode in accordance with another embodiment of the invention, in an early stage of manufacture, this view being taken along the line 4—4 in FIGURE 5.
Figures 5, 6, 7:
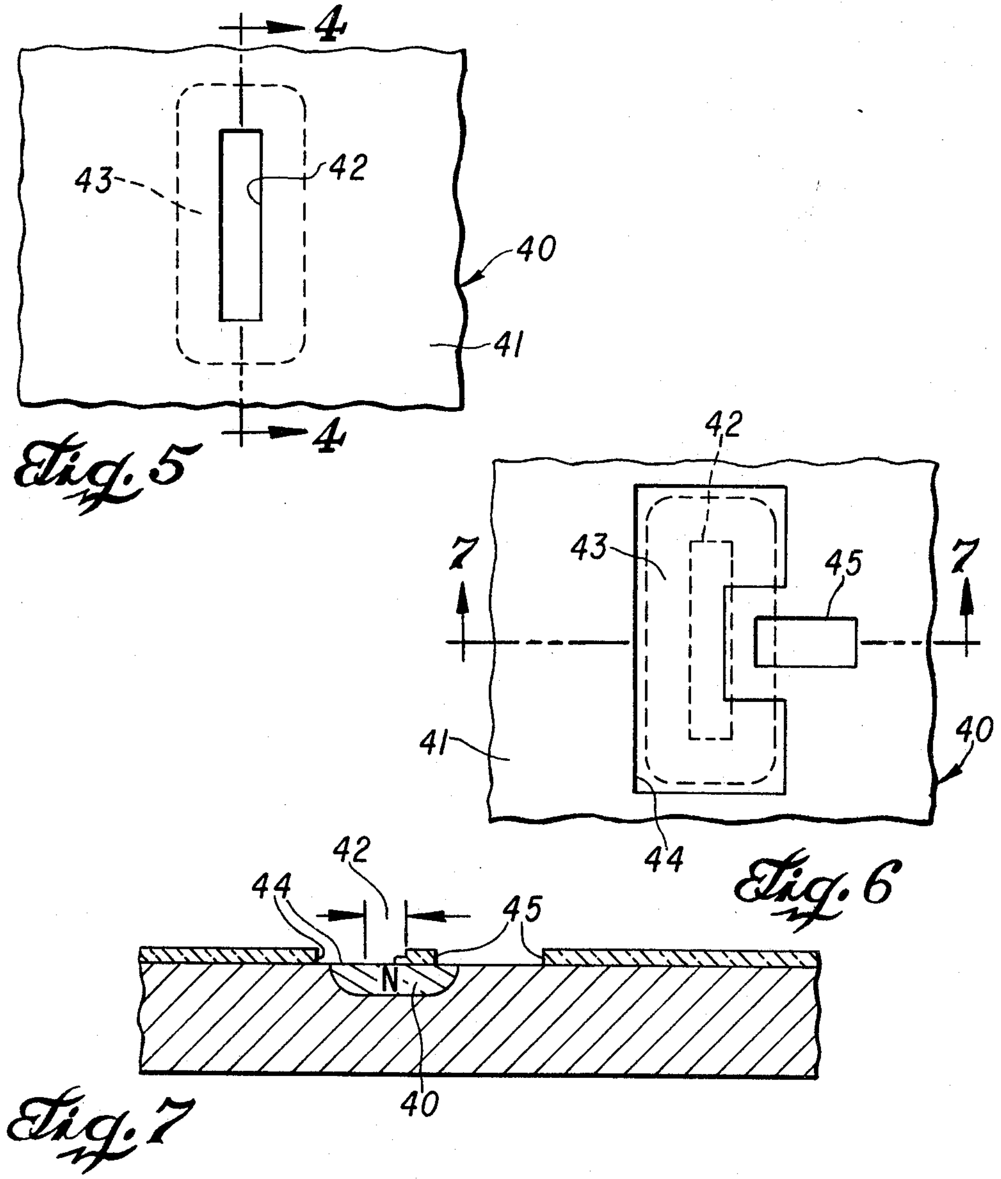
FIGURE 5 is a plan view of the device of FIGURE 4.
FIGURE 6 is a plan view of the device of FIGURES 4 and 5 at a later stage of manufacture.
FIGURE 7 is an elevation view in section of the device of FIGURE 6, taken along the line 7—7 in FIGURE 6.

Another embodiment of the mixer diode will now be described with reference to FIGURE 4. In this embodiment only a single diffusion operation is used to provide both the rectifying and ohmic connection regions. The starting material again is a slice or bar 40 of high resistance semiconductor material, such as 1000 Ω-cm. silicon. An insulating coating 41 is formed on the top surface of the bar, and a rectangular hole 42 is opened in the oxide by photoresist masking and etching. The slice is now subjected to a donor diffusion operation of conventional type whereby an n-type region 43 is formed. It is very important to note at this point that the donor impurities, phosphorus for example, will diffuse roughly the same distance laterally beneath the oxide as the vertical diffusion depth, this distance being up to about 1 mil. This fact, coupled with the classic diffusion profile or concentration gradient, provide a distinguishing feature of this embodiment and permit the construction of a single-sided diode using a minimum number of process steps. This will be explained more fully below. After the diffusion step, the top surface of the oxide is covered with photoresist, exposed in a proper pattern, then developed and etched to provide holes in the oxide as seen in FIGURES 6 and 7. A large hole 44 overlies what was the original hole 42 and extends out over some of the lateral regions of the diffused region 43. It is to the silicon exposed by the hole 44 that ohmic contact is to be made to the cathode of the diode. A smaller hole 45 is opened in the oxide at the same time, this hole being over the edge of the diffused n-type region 43 where the concentration is much lower than immediately under where the hole 42 existed. The hole 45 may also extend beyond the edge of the region 43 out over the semi-insulating or high resistance silicon substrate 40, this extension performing no function in the operating device but instead merely permitting the mask to have one larger dimension than otherwise would be the case providing somewhat better photographic definition. After suitable cleaning of the surface, the slice is now ready for metallization, to which end a thin film of molybdenum is deposited over the top surface, followed by a thicker film of gold. The molybdenum does not alloy with the silicon surface but merely makes metal-semiconductor contact.

Figure 8:
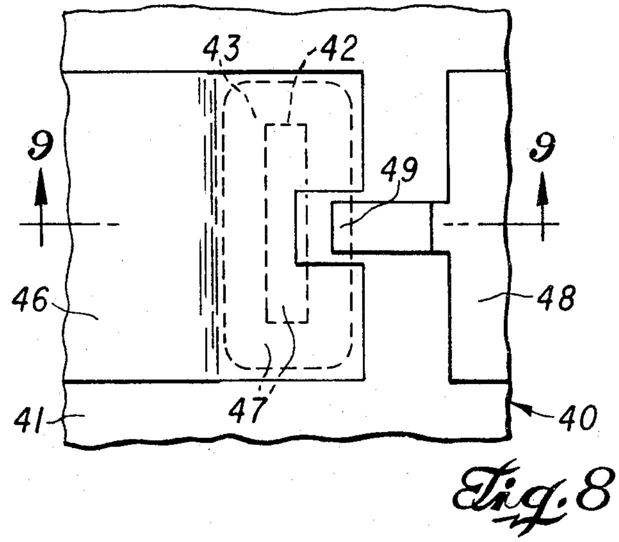
FIGURE 8 is a plan view of the completed device made as illustrated in FIGURES 4–7.
Figure 9:
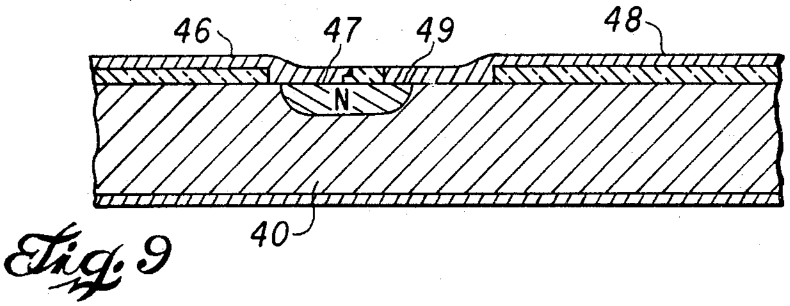
FIGURE 9 is an elevation view in section of the device of FIGURE 8, taken along the line 9—9 in FIGURE 8.
Figure 10:
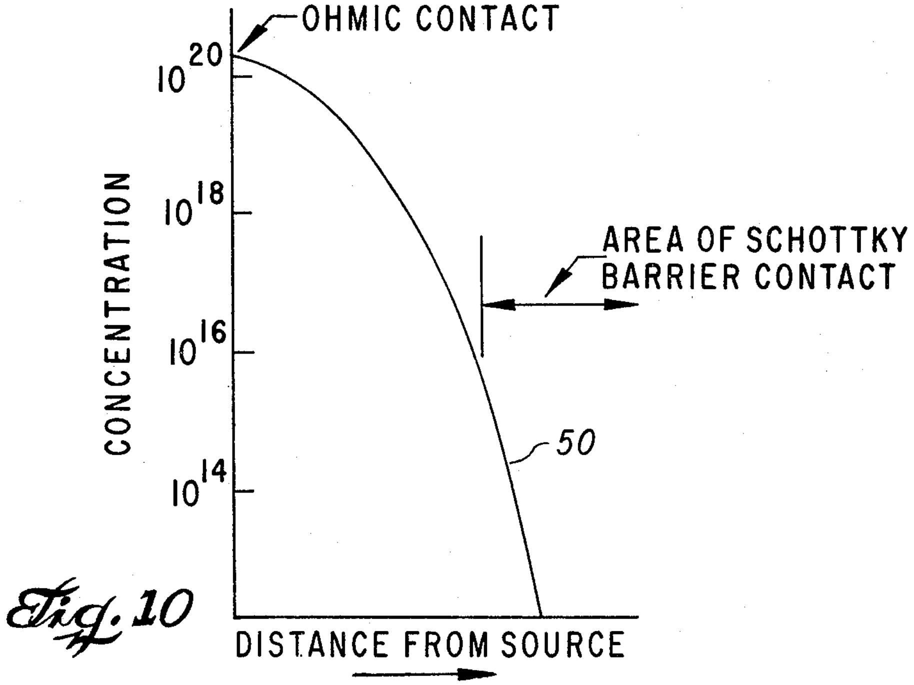
FIGURE 10 is a graphical representation of the donor impurity concentration in the one of the semiconductor regions of the device of FIGURES 4–9 plotted as a function of distance.

To provide the finished device of FIGURES 8 and 9, the unwanted metallization is now removed by the usual photoresist masking and etching operation to leave a metal strip 46 which makes ohmic contact in an area 47 to the diffused region 43 in the hole 44, and a metal strip 48 which makes rectifying or Schottky barrier connection to the edge of the region 43 at the area 49 in the hole 45. It will be noted that the same metal deposited in the same way makes rectifying contact at area 49 but ohmic contact at area 47. This result may best be understood by reference to FIGURE 10 where the graph represents the impurity concentration in a diffused region as a function of the distance away from the diffusion source. In the device just described, the diffusion source is limited to the area 42 which is the opening in the oxide mask. The lateral spreading of the diffused n-type region 43 will have a concentration gradient similar to that in the vertical direction directly beneath the hole, and it is this gradient which is illustrated in FIGURE 10. At the source, which is at the silicon surface in are area of the hole 42, the concentration will be at about the solid solubility for phosphorus in silicon, or above $10^{20}$/cm.$^3$. It is at this point that ohmic contact is made. In the zone 50 on the graph, the concentration will have decreased to about $10^{15}$ or less, and it is at this point that the proper conditions exist for making rectifying or Schottky barrier contact.

In the device of FIGURES 4–10, as well as in the FIGURES 1–3 embodiment, utilization is made of the principle that a Schottky barrier diode is formed at the interface of an n-type semiconductor and a metal having a work function which is greater than that in the semiconductor. For molybdenum, the work function, Φ, is 4.15 ev. Gold, platinum or palladium would make Schottky barrier connection, but might not be as compatible with the other manufacturing steps to which the semiconductor device is subjected. In the semiconductor material, the work function is dependent upon the Fermi level, which is dependent upon the doping level. To achieve a low work function in n-type silicon, and thus to provide a good rectifying barrier, the doping level must be low, down in the range of perhaps $10^{15}$/cm.$^3$. Slightly higher doping levels still provide Schottky barrier contact, but of lower quality. To provide a Schottky barrier diode on p-type semiconductor material, the opposite condition exists; the work function of the metal must be less than the work function in the semiconductor.

Although the embodiments discussed above refer to the use of silicon as the substrate material, it will be noted that other semiconductor materials may be used as well. For example, the substrate may be semi-insulating GaAs, which is formed by doping with a deep trap such as Fe or Cr producing a resistivity of perhaps $10^6$ Ω-cm., and an n-type GaAs region may be formed by etch and redeposit techniques as discussed above to provide a region for the barrier diode. Various other III–V materials or mixtures thereof, as well as combinations of III–V's and Group IV semiconductors, such as Ge on semi-conducting GaAs or Si on semi-insulating gallium phosphide, may be used. Instead of forming the extrinsic region (corresponding to the region 18) on or in a previously existing substrate, the region may be provided as a mesa on top of a single crystal substrate, then polycrystalline or ceramic material deposited over the mesa and the original single crystal substrate removed by lapping to leave single crystal islands (originally mesas) in a high resistance polycrystalline or ceramic substrate. This latter technique is referred to in the art as the insulated isolation process. It should be emphasized at this point that the substrate, be it single- or polycrystalline semiconductor material, ceramic, epoxy, or the like, must itself be of high resistance to provide the transmission line dielectric, it not being sufficient that the diodes or other components be merely isolated from one another as is the primary requirement in most integrated circuits. Germanium, for example, would not function as a dielectric because its maximum or intrinsic resistivity is only about 50 Ω-cm.

It is appreciated of course that the single sided diode of this invention, although having perhaps its greatest utility as a microwave mixer, is useful as well as a diode for other purposes such as logic functions, etc. Also, the diode may be combined on a common substrate with various other circuit elements such as single-sided transistors, deposited resistors or inductors, etc., to provide in a unitary structure an almost unlimited variety of integrated electronic functions.

Accordingly, although the invention has been described with reference to specific embodiments, it will be understood that these embodiments are merely illustrative and are not to be construed in a limiting sense. Various modifications of the disclosed embodiments, as well as other embodiments of the invention, will be apparent to persons skilled in the art. It is therefore understood that any such modifications or embodiments will be encompassed hereby as the invention is interpreted only according to the true scope thereof and by the terms of the appended claims.

What is claimed is:

1. A semiconductor microwave device comprising:
(a) a generally flat substrate of high resistivity dielectric material;
(b) a shallow region of extrinsic monocrystalline semiconductor material of one conductivity type positioned in one face of the substrate;
(c) said region including contiguous zones of said one conductivity type, one of relatively heavily doped semiconductor material and the other of relatively lightly doped semiconductor material adjacent said one face;
(d) a first narrow strip of metal extending along the top of said substrate on said one face, an end of the strip ohmically engaging the zone of relatively heavily doped material,
(e) a second narrow strip of metal extending along the top of said substrate on said one face, an end of the strip engaging the relatively lightly doped material and making rectifying connection thereto etc.;
(f) and a coating of conductive metal on the other face of the substrate.

2. A device according to claim 1 including a second shallow region of extrinsic monocrystalline semiconductor material of said one conductivity type positioned in said one face of said substrate, said second shallow region including first and second contiguous semiconductor zones adjacent said one face, and first zone being relatively heavily doped and said second zone being relatively lightly doped, a third narrow strip of metal extending along the top of said substrate of said one face having one end ohmically engaging said first zone of said second region, a fourth narrow strip of metal extending along the top of said substrate on said one face having an end engaging said second zone of said second region and making rectifying connection thereto, and said first narrow strip being electrically connected to said fourth narrow strip.

3. A device according to claim 2 wherein said substrate comprises intrinsic semiconductor material, and said narrow strips each overlie a portion of said conductive metal coating, said substrate, said strips and said metal coating forming strip transmission lines at the microwave operating frequencies of said device.

4. A device according to claim 3 wherein said region is n-type, and wherein said strips of metal are composed of the same material.

5. A combined unitary microstrip transmission line and metal-semiconductor barrier diode device comprising:
(a) a generally flat substrate of semiconductor material of high resistivity comprising the dielectric portion of the microstrip transmission line;
(b) a first region of extrinsic semiconductor material of one conductivity type in one face of the substrate occupying only a very small portion of the total area of said one face;
(c) a zone of semiconductor material of said one conductivity type much more heavily doped than said first region positioned at least partly in the top surface of said first region;
(d) a first narrow conductive strip extending along said one face with an end of such strip engaging the surface of said first region to provide a metal-semiconductor barrier connection therewith, said first strip defining a portion of the top conductor of the microstrip transmission line;
(e) a second narrow conductive strip extending along said one face with an end of such strip engaging the surface of said zone of semiconductor material to provide a non-rectifying connection thereto, said second strip defining another portion of the top conductor of the microstrip transmission line;
(f) and a coating of conductive material on the other face of said substrate defining the ground plane of the microstrip transmission line.

6. A device according to claim 5 wherein the first region has a donor impurity concentration of no more than on the order of about $10^{16}$ atoms per cubic centimeter, wherein the zone has a donor impurity concentration of on the order of at least about $10^{20}$ atoms per cubic centimeter, and wherein the first and second conductive strips are metal and composed of the same materials and are not alloyed with the surface of the semiconductor material.

7. A combined unitary microstrip transmission line and metal-semiconductor barrier diode device comprising:
(a) a generally flat substrate of semiconductor material of high resistivity comprising the dielectric portion of the microstrip transmission line;
(b) a first region of extrinsic semiconductor material of one conductivity type in one face of the substrate occupying only a very small portion of the total area of said one face;
(c) a zone of semiconductor material of said one conductivity type much more heavily doped than said first region positioned at least partly in the top surface of said first region;
(d) a first narrow conductive strip extending along said one face with an end of such strip engaging the surface of said first region to provide a metal-semiconductive barrier connection therewith, said first strip defining a portion of the top conductor of the microstrip transmission line;
(e) a second narrow conductive strip extending along said one face with an end of such strip engaging the surface of said zone of semiconductor material to provide a non-rectifying connection thereto, said second strip defining another portion of the top conductor of the microstrip transmission line;
(f) a second region of extrinsic semiconductor material of said one conductive type in said one face of the substrate occupying only a very small portion of the total area of said one face;
(g) a second semiconductor zone of said one conductivity type much more heavily doped than said second region positioned at least partially in the top surface of said second region;
(h) a third narrow conductive strip extending along said one face having an end ohmically engaging the surface of said second zone;

(i) a fourth narrow conductive strip extending along said one face having an end engaging the surface of said second region to provide a metal semiconductor barrier connection therewith, said first and third conductive strips being electrically connected;

(j) and a coating of conductive material on the other face of said substrate defining the ground plane of the microstrip transmission line.

8. A semiconductor diode comprising a wafer of semiconductor material, a coating of insulting material on one face of the wafer, the insulating material functioning as a diffusion mask and defining a small opening therein, a diffused extrinsic semiconductor region of one conductivity type beneath said opening within the wafer, the diffused region having a zone of very high impurity concentration immediately below the surface of said opening with the impurity concentration decreasing in a gradient away from said zone in a lateral direction beneath said coating to provide a zone of relatively low impurity concentration, a metal contact in non-alloyed engagement with the surface of said one face of the wafer over said zone of very high concentration to provide a non-rectifying electrical connection, and another metal contact engaging the surface of said one face of the wafer over said zone of low concentration to provide a metal-semiconductor rectifying barrier connection.

9. A method of making a semiconductor device comprising the steps of:

(a) masking a surface of a semiconductor body to leave exposed a small portion of such surface;

(b) diffusion conductivity-type determining impurity into said surface to produce a heavily doped region immediately beneath said portion grading to a lightly doped region which extends beneath said mask along said surface spaced from said portion; and thereafter (c) securing a first metal contact to said small portion of the surface of the semiconductor body in engagement with said heavily doped region to provide an electrical connection of one characteristic and (d) securing a second metal contact to the surface of the semiconductor body in engagement with said lightly doped region to provide an electrical connection of a different characteristic.

10. A method according to claim 9 wherein the semiconductor body is of very high resistivity semiconductor material.

11. A method according to claim 10 wherein the first and second metal contacts are of the same materials and wherein the first metal contact provides a non-rectifying electrical connection and the second metal contact provides a rectifying electrical connection.

12. A method according to claim 11 including the step of covering an opposite surface of the body with a conductive material to provide a ground plane; wherein the second metal contact provides a metal-semiconductor non-alloyed barrier connection; and wherein elongated metal strips are applied along with said first and second metal contacts to provide strip transmission lines.

13. A semiconductor device comprising a high resistivity semiconductor substrate defining portions of strip transmission lines, a monocrystalline semiconductor region of one conductivity type in one face of said substrate occupying only a very small portion of the total area of said one face, said region including two contiguous zones, one of which is relatively heavily doped and the other of which is relatively lightly doped at said one face, said zone which is relatively lightly doped extending from the surface of said region at least as deep as said zone which is relatively heavily doped, a first conductive strip defining a portion of one of the strip transmission lines and extending along the top of said substrate on said one face having an end ohmically engaging said zone which is relatively heavily doped at the surface of said region, a second conductive strip defining a portion of another of the strip transmission lines and extending along the top of said substrate on said one face having an end engaging said zone which is relatively lightly doped and making rectifying connection thereto at the surface of said region, and a metal coating on the other face of said substrate, said metal coating, said substrate and said first and second conductive strips comprising the strip transmission lines for signals applied to said zones.

14. A semiconductor device comprising a high resistivity semiconductor substrate defining portions of strip transmission lines, a region of monocrystalline semiconductor material of one conductivity type in one face of said substrate occupying only a very small portion of the total area of said one face, said region including two contiguous zones one of which is relatively heavily doped and the other of which is relatively lightly doped at said one face, said zone which is relatively lightly doped underlying said zone which is relatively heavily doped and extending to said one face, a first conductive strip defining a portion of one of the strip transmission lines and extending along the top of said substrate on said one face having an end ohmically engaging said zone which is relatively heavily doped, a second conductive strip defining a portion of another of the strip transmission lines and extending along the top of said substrate on said one face having an end engaging said zone which is relatively lightly doped and making rectifying connection thereto, and a conductive coating on the other face of said substrate, said conductive coating, said substrate and said conductive strips comprising the strip transmission lines for signals applied to said zones.

15. A microwave circuit comprising a high resistivity semiconductor substrate defining portions of strip transmission lines, a metal-semiconductor barrier circuit element in one face of said substrate and wholly spaced from the opposite face of said substrate, said circuit element including a semiconductor region of one conductivity type, said region including two contiguous zones, one of which is relatively heavily doped and the other of which is relatively lightly doped at said one face, a conductive ground plane across said opposite face of said substrate defining portions of the strip transmission lines, a first conductive strip defining a portion of one of the strip transmission lines and extending over said one face and having an end ohmically engaging said zone which is relatively heavily doped, said first strip, said substrate and said ground plane comprising the one strip transmission line, a second conductive strip defining a portion of another strip transmission line and extending over said one face and having an end engaging said zone which is relatively lightly doped to form a rectifying metal-semiconductor barrier therewith, said second strip, said substrate and said ground plane comprising the another strip transmission line.

References Cited

UNITED STATES PATENTS

| | | | |
|---|---|---|---|
| 3,445,793 | 10/1969 | Biard | 333—84 |
| 3,280,391 | 10/1966 | Bittmann | 317—234 |
| 3,293,087 | 12/1966 | Porter | 148—175 |
| 3,292,056 | 12/1966 | Emeis | 317—234 |
| 3,226,611 | 12/1965 | Haenichen | 317—234 |
| 3,121,809 | 2/1964 | Atalla | 307—88.5 |

JOHN W. HUCKERT, Primary Examiner

M. H. EDLOW, Assistant Examiner

U.S. Cl. X.R.

317—235; 333—84